United States Patent [19]

Hoffman

[11] Patent Number: 4,765,853
[45] Date of Patent: Aug. 23, 1988

[54] METHOD OF MAKING A PRESSURIZED BALL

[76] Inventor: Allan C. Hoffman, 2891 Rumsey Dr., Riverside, Calif. 92506

[21] Appl. No.: 105,662

[22] Filed: Oct. 7, 1987

[51] Int. Cl.$^4$ .............................................. B32B 31/04
[52] U.S. Cl. ..................................... 156/145; 156/146; 156/147; 156/245; 273/61 C; 273/61 D; 273/61 R
[58] Field of Search ............... 156/145, 146, 147, 242, 156/245; 273/61 R, 61 D, 61 C

[56] References Cited

U.S. PATENT DOCUMENTS

| Re. 172,000 | 1/1929 | Reach | 273/61 R |
|---|---|---|---|
| 1,163,987 | 12/1915 | Eggers | 156/145 |
| 1,346,848 | 7/1920 | Roberts | 273/61 R |
| 2,294,424 | 9/1942 | Roberts | 273/61 R |
| 2,373,899 | 4/1945 | Lejeune | 273/61 R |
| 3,428,314 | 2/1969 | Haines et al. | 273/61 R |
| 3,428,315 | 2/1969 | Haines | 273/61 R |
| 4,240,630 | 12/1980 | Hoffman | 273/61 R |
| 4,327,912 | 5/1982 | Hoffman | 273/61 R |

FOREIGN PATENT DOCUMENTS

| 1108555 | 4/1968 | United Kingdom | 273/61 R |
|---|---|---|---|
| 2038643 | 7/1980 | United Kingdom | 273/61 R |

OTHER PUBLICATIONS

A. C. Hoffman Engineering, Inc., Drawing, "Tennis Ball Bonding Cav."(Dated 6/19/87).

*Primary Examiner*—Caleb Weston
*Attorney, Agent, or Firm*—Poms, Smith, Lande & Rose

[57] ABSTRACT

An improved method of making a fabric covered tennis ball is disclosed wherein a pair of molded semi-hemispheric elastomeric material core halves are joined together by a thermosetting adhesive means, the joining of the core halves taking place in the presence of atmospheric pressure. Heat and pressure are applied externally to the core halves to cure and set the adhesive, and in a preferred embodiment to localize areas, particularly where the adhesive resides between the core halves. An integrally molded air valve is provided in a side wall of one of the core halves to facilitate the introduction of additional air pressure into the core after its having been bonded in assembled condition. A tennis ball fabric covering is provided about and adhesively secured to the core covering the air valve, the fabric being air permeable to allow introduction of additional amounts of air into the completed tennis ball to facilitate production of a desired ball bounce characteristic for the tennis ball.

14 Claims, 2 Drawing Sheets

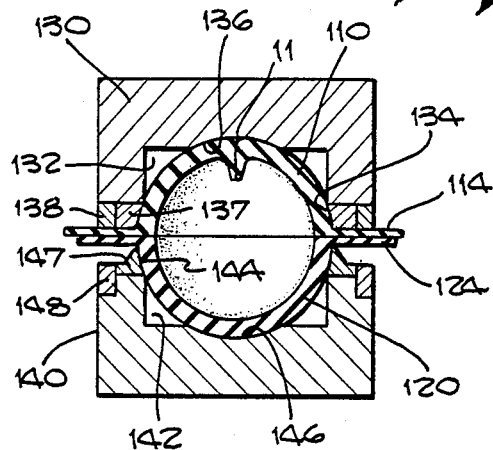
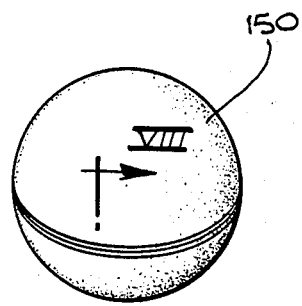
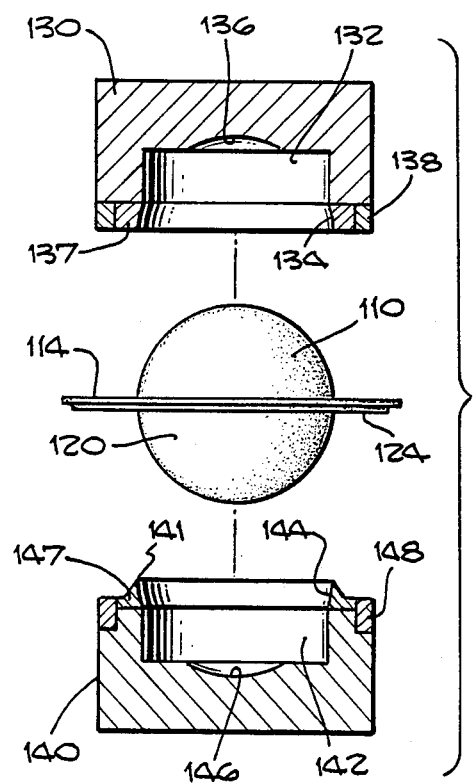
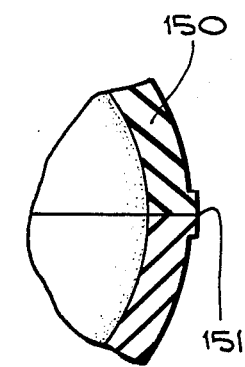

METHOD OF MAKING A PRESSURIZED BALL

BACKGROUND OF THE INVENTION

The present invention relates in general to methods of making pressurized balls and more particularly to an improved, faster method of making a two part core for tennis balls, or the like, where the core halves are thermally bonded to one another.

The conventional, presently used methods of manufacturing pressurized ball cores, such as for tennis balls, is to bond two semi-hemispheric ball halves by pressing together the cemented edges of the two halves in a pressurized environment. When making tennis balls, such pressurized environment is approximately 18 psi above atmospheric pressure at sea level. Subsequently, when the thermosetting adhesive or cement is cured through the use of heat, the captured air mass within the ball causes the internal ball pressure to increase greatly, this is particularly true where curing temperatures are in excess of 300° F. Such captured internal air mass and the resultant pressure occasioned by the curing temperatures increases the time for requiring the associated mold to be maintained in a closed position since it is necessary to not only allow the associated cement or adhesive to be cooled, and thus set the adhesive with the core halves bonded together, but also to allow cooling of the captured air mass so that the internal pressures will be reduced to a level which will not blow the two core halves apart. Therefore, conventional methods now used require that the bonding mold and the ball core be cooled down sufficiently to lower the temperature of the core and the air inside to create a pressure value that will not blow the ball apart.

It is also common in present methods of making presurized ball cores to have the partible mold used for pressuring and heating the core halves together have an intimate complete surface to surface contact to withstand the high internal pressures occasioned by the heating of the captured elevated air pressure within the core.

SUMMARY OF THE INVENTION

It is an object of the present invention to disclose and provide an improved, faster method of making pressurized ball products, such as tennis balls, wherein a pair of semi-hemispheric core halves are to be bonded together through the use of a thermosetting adhesive or cement. It is also an object of the present invention to disclose and provide as a part of such method the utilization of mold apparatus and core half constructions which facilitate the avoidance of high internal core pressures during the adhesive curing and setting process as well as to provide ways to use elevated temperatures in a localized manner near the adhesive to be cured in an even shorter mold closure time period prior to when the core can be released from the mold.

Generally stated, the method of making a two part core for a ball, such as a tennis ball or the like, in accordance with the present invention includes the steps of providing a pair of molded semi-hemispheric elastomeric material core halves wherein one of the halves is provided with an integrally molded air valve in a side wall thereof. Each of said core halves is also provided with an annular generally flat base surface to facilitate abutting contact between the two halves to provide a ball core. A thermosetting adhesive means is applied to the base surfaces of the core halves for thermal bonding of halves together and the core halves are joined to each other in the presence of merely atmospheric pressure, with no effort being made to increase or decrease the atmospheric pressure within the core. The mass of air thus provided within the core is determined by the atmospheric pressure at the time the core halves are joined together. Subsequently, heat and pressure are applied externally to the joined core halves to cure and set the adhesive means with the core halves interior air mass being only that occurring by virtue of the atmospheric pressure as it existed when the halves were joined together.

More specifically, the method of making a two part core for a ball, such as a tennis ball or the like, contemplates the foregoing steps with the further substeps of providing a partible mold having a cavity to receive the joined core halves, the parting mold being provided with trimming or cutting edge means so that the core halves flashing, which normally occurs the molding of such core halves, may be trimmed as the mold parts are brought together on closing of the mold. Core halves are pressured against one another by the closing of the mold and the adhesive is heated by conduction occurring by virtue of the contact between the core halves and the heated mold. The mold may be heated in accordance with conventionally known means. However, as particularly contemplated within the present method, the heating is preferably localized in those areas where the core halves abut, i.e. where the seam or seam periphery is exposed outwardly of the core and the adjacental marginal edge areas of the core halves on either side of such seam periphery. Such localizing of the heating of the core halves in the seam area, according to a feature of the present invention, is accomplished by reducing the surface to surface contact between the core halves and the surrounding mold. By avoiding the introduciton of additional air mass into the core in accordance with the present method, the mold need not contact the entire outer surface of the core during the thermal bonding process, but may engage the marginal areas of the seam where the adhesive is provided between the core halves. It is contemplated that the present invention will allow the use of elevated temperatures and much shortened time periods for thermally bonding such core halves.

As a still further feature of the present method, the cores made in accordance with the method as thus far described may be utilized in the manufacture of tennis balls by applying a tennis ball fabric to the cores with the fabric even covering the integral air valve. Such tennis balls may be pressured to a desired bounce characteristic by introducing sufficient amounts of air to accomplish the same. Such additional air may be introduced into the core partially or fully before the application of the fabric and/or partially or fully after the application of the fabric.

It is submitted that a more complete understanding and realization of additional advantages and objects of the present invention in a method of making two part pressurized ball cores, preferably of the type suitable for use in tennis balls, will become apparent to those skilled in the art from a consideration of the following detailed description of exemplary embodiments thereof. Before commencing such description, however, a brief description will be given of the figures set forth on the appended sheets of drawings, like parts in the various figures being referred to by like reference numerals.

DESCRIPTION OF THE DRAWINGS

FIG. 5 shows an alternative embodiment of molding apparatus in accordance with the present invention for localizing application of core closing pressure and the application of core seam bonding temperatures just prior to closing of the mold and trimming of the excess core material.

FIG. 6 is an exploded view of the apparatus and core of FIG. 5.

FIG. 7 is an exemplary embodiment of two part core for a tennis ball, or the like, made in accordance with the method of the present invention.

FIG. 8 is a section view of a portion of the core of FIG. 7 taken therein along the plane VIII—VIII.

DESCRIPTIONS OF THE PREFERRED EMBODIMENTS

Figure 3:
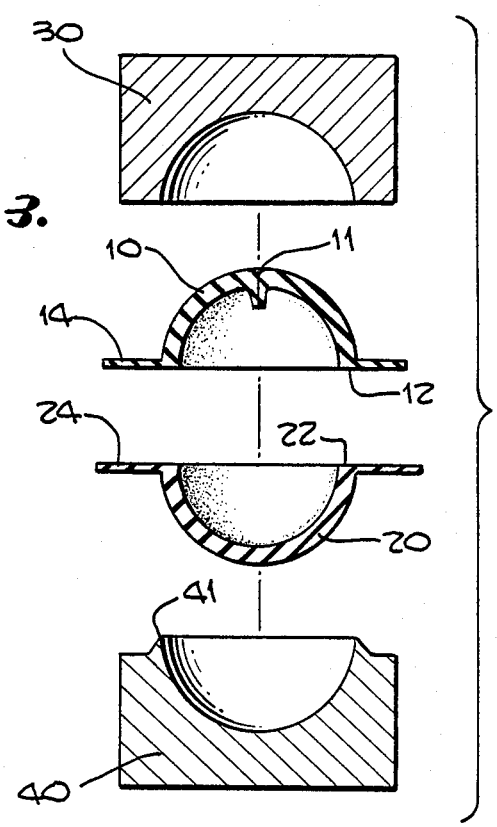
FIG. 3 is an exploded view of a pair of semihemispherical ball core halves shown prior to there being adhesively secured together and prior to being trimmed and thermally bonded together by an associated molding apparatus.

The method of making a two part core for a tennis ball, or the like, of the present invention utilizes the provision of a pair molded semi-hemispheric elastomeric material core halves 10 and 20, as seen in FIG. 3, with one of said halves, such as core half 10 having an integrally molded air valve, indicated generally at 11, in a side wall thereof. Such air valve is preferably made in accordance with the disclosures of my prior U.S. Pat. Nos. 4,240,630 and 4,327,912. Each of the core halves 10 and 20 are further provided with annular, generally flat, base surfaces 12 and 22. In the molding of such core halves, it is common for flashing 14 and 24 to occur along with the molding of the semi-hemispherical core parts which is normally trimmed in a trimming step not associated with the bonding process.

Figure 1:
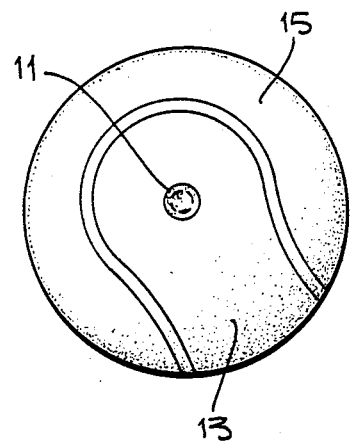
FIG. 1 is a plan view of an exemplary embodiment of pressurized tennis ball having an integrally molded air valve in a side wall thereof which can be made by the method of the present invention.
Figure 4:
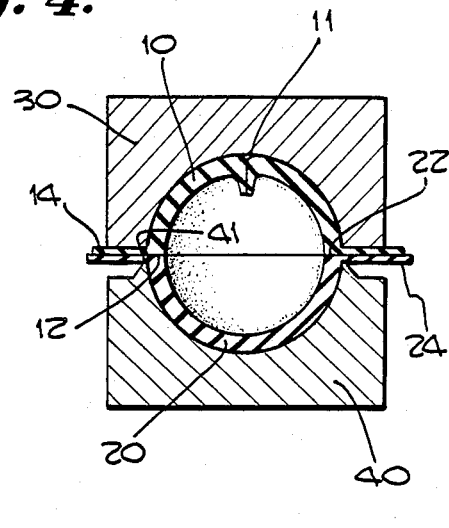
FIG. 4 shows the molding apparatus of FIG. 3 closing about a ball core being bonded together by a thermal adhesive in accordance with the method of the present invention.
Figure 2:
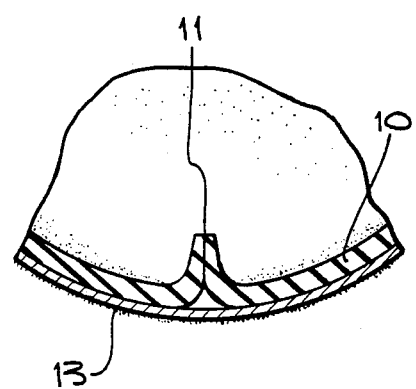
FIG. 2 is a section view through a portion of the ball of FIG. 1 showing the exemplary air valve molded integrally of the side wall of the ball core and which lies beneath an air permeable fabric tennis ball cover.

One of the features of the present invention in a method of making a two part core for a ball is to provide a trimming or cutting edge 41 of annular configuration on the lower mold part 40 for trimming of the flashing 14 and 24 and when the upper mold part 30 is aligned to the lower part 40, whereby closing of the partible mold parts 30, 40 automatically trims the core halves as seen in FIG. 4.

As in prior methods of making two part cores for balls, the present method contemplates the conventional step of cementing or adhesively bonding the two core halves together, preferably through the use of a thermosetting adhesive as known in the art. Such adhesive may be applied to the base surfaces 12 and 22 of the two core halves 10 and 20 and placed into intimate abutting contact to join the two halves together either prior to or as a part of the closing of the mold parts 30 and 40 as seen in FIG. 4. In prior art processes, however, where a pressurized ball is being made, the desired air pressure for such ball is provided within the core by the joining the core halves together in a pressurized environment. However, as discussed briefly before, the presence of additional air mass within the core complicates and extends the mold closure time required for making such a pressurized ball core.

As is particularly contemplated within the method of the present invention, the core halves 10 and 20 of the present invention are joined together in the presence of merely atmospheric pressure without any effort being made to increase or decrease the air mass within the joined core halves. It is anticipated, thereby, that the core assembly thus provided will have interior air pressure essentially that of the surrounding atmosphere and that the massive air so provided within the core prior to thermal bonding of the associated adhesive will be that determined by such atmospheric conditions.

As seen in FIG. 4, the joined core halves may be simultaneously trimmed and subjected to heat and pressure for purposes of curing and setting the adhesive by simply closing and heating the mold parts as done in prior ball core molding operations. However, I found that by avoiding the introduction of additional air mass into the core prior to the thermal bonding of the core seam, where the core halves having abutting base surfaces, I have greatly reduced the time of closure for the mold as was required in prior art processes.

Referring specifically to FIGS. 5 and 6, I have further found that the mold closure time can be even more shortened in accordance with the present method by localizing the application of heat to the core seam, or seam periphery, where the adhesive or cement is positioned between the abutting core half base surfaces, and the adjacent marginal surfaces of the core. As best seen in FIG. 6, the alternative embodiment of partible mold has an upper mold part 130 and a lower mold part 140, the latter having a trimming, knife edge 141 for trimming the flashing 114 and 124 of the exemplary ball core halves 110 and 120. As particularly contemplated within the present invention, the surface to surface contact between the mold parts and the ball core is reduced by the annular recesses 132 and 142 cut into the respective mold parts so as to leave reduced ball core engaging annular surfaces 134 and 144. Top and bottom concave circular core half engaging and positioning surfaces 136 and 146 also remain after the cutting of the recesses 132 and 142.

The core engaging surfaces 134 and 144 as well as the knife edge 141 for the mold as discussed above may, in the preferred exemplary embodiment, comprise a beryllium copper material insert such as inserts 137 and 147 illustrated in FIGS. 5 and 6. Beryllium copper material is preferred because of its excellent heat conduction characteristic and it can be heat treated to the same hardness as tool steel to facilitate its function as a trimming tool in the mold of the present application disclosure. In addition, a heating collar, known in the art, may be provided in juxtaposition of the beryllium copper inserts 137 and 147 as represented by the heating collar elements 138 and 148 in FIGS. 5 and 6. By such juxtaposition of heating collars 138 and 148 to the highly heat conductive beryllium copper material inserts which provide the core engaging surfaces 136 and 146, excellent heat transmission to the desired marginal areas of the core halves is attained.

In view of the foregoing, and as can be seen in FIG. 5, when the alternative embodiment of partible mold parts 130 and 140 are closed about the core halves 110 and 120, the flashing 114 and 124 is trimmed as the core half positioning and pressuring top and bottom surfaces 136 and 146 and the annular surfaces 134 and 144 engage the core. A reduced surface to surface contact, between the mold parts and the core halves is provided in a zone adjacent the core periphery in the area of the seam or mating base surfaces, occurs by virtue of the reduced engaging surfaces 134 and 144 of the respective mold parts. As is particularly contemplated within the present method, the heating of the mold parts 130 and 140 with the reduced surface to surface contacts so provided will localize the application of heat to portions only of the core halves, reducing the core heating in those areas where the cutouts 132 and 142 space the mold surfaces away from the core halves. I have found that I can use a higher thermal bonding temperature with lower internal core pressures through the use of the present embodiment of mold in the present method to obtain a quicker bond and trim time to allow release of the ball core from the mold. In a preferred method in accordance with my present invention, I utilize a temperature of 340° F. for a period not exceeding two minutes with an immediate opening of the mold following such time period, the ball core thus formed withstanding the current bounce characteristic test for current commercial tennis balls. Such core 150 is illustrated in FIG. 7 with the trimmed thermally bonded seam 151 being shown in the enlarged view of FIG. 8.

Having made the ball core 150 in accordance with the present method as thus far described, through the use of the mold apparatus of FIGS. 3-4 or 5-6, it is also contemplated within my present invention to proceed in a preferred exemplary embodiment of the present method to make a pressurized tennis ball, or the like, from the unpressurized quickly bonded, trimmed and mold released core. As known per se in the art of tennis ball manufacturing, a pair of generally figure eight fabric pieces 12 and 13 are preferably applied to and adhesively bonded to the ball core in known manner. Preferably, the fabric covers the integrally formed air valve, indicated generally at 11, with the fabric being provided in the form of an air permeable material. The core can be pressurized before, during or after application of the fabric as desired. In any event, the desired bounce characteristics for the ball manufactured with the core made in accordance with the present method may be obtained by introducing additional air through the integral air valve 11 until the desired pressure within the ball is obtained.

Having thus described exemplary embodiments of the present method of making a two part core for a tennis ball, or the like, it should now be apparent to those skilled in the art that the afore stated objects and advantages stated for the present invention have been obtained. It should also be apparent to those skilled in the art that various modifications, adaptations and deviations from the precise apparatus or materials discussed may occur in the future which would utilize my present invention which is defined and limited only by the following claims.

I claim:

1. A method of making a two part core for an internally pressurized tennis ball or the like comprising the steps of:
   (a) providing a one-way air valve in a side wall of at least one of a pair of molded semi-hemispheric elastomeric material core halves with each of said halves having an annular generally flat base surface;
   (b) applying a thermosetting adhesive means to said base surfaces of said core halves for thermal bonding of said halves together;
   (c) joining said core halves to each other in the presence of atmospheric pressure with said base surfaces in abutting relation;
   (d) applying heat and pressure externally to said joined core halves to cure and set said adhesive means with said core halves interior air mass being only that occurring by virtue of the atmospheric pressure as it existed when said halves were joined together; and
   (e) introducing air under pressure into the interior of said core through said valve to pressurize the interior of said ball.

2. The method of claim 1 wherein said step of applying heat and pressure to cure and set said adhesive means comprises the substeps of:
   (a) providing a partible mold having a cavity to receive said joined core halves;
   (b) trimming any excess material off of the periphery of said core halves where said base surfaces abut by cutting edges on said mold which come together as said mold closes about said joined core halves;
   (c) pressurizing said halves against each other by the closing of said mold about said core halves;
   (d) heating said core halves by heating said mold with said core halves in contact with said mold.

3. The method of claim 2 wherein said substep of heating said core halves by heating said mold comprises the further substeps of:
   localizing the heating of said core halves to the periphery of said core halves where their respective base surfaces abut and marginal areas of said core halves adjacent said periphery.

4. The method of claim 3 wherein said substep of localizing the heating of said core halves comprises the further substep of reducing the surface to surface contact between said core halves and mold by shaping the interior surfaces of said mold so as to contact only said periphery and marginal areas of core halves to mold engagement with limited top and bottom mold halves to mold engagements to position and pressure said halves together.

5. A method of making an internally pressurized tennis ball comprising the steps of:
   (a) providing a one-way air valve in a side wall of at least one of a pair of molded semi-hemispheric elastomeric material core halves with each of said halves having an annular generally flat base surface;
   (b) applying a thermosetting adhesive means to said base surfaces of said core halves for thermal bonding of said halves together;
   (c) joining said core halves to each other in the presence of atmospheric pressure with said base surfaces in abutting relation;
   (d) applying heat and pressure externally to said joined core halves to cure and set said adhesive means with said core halves interior air mass being only that occurring by virtue of the atmospheric pressure as it existed when said halves were joined together;
   (e) applying an air - permeable material cover about said core and covering said air valve; and (f) introducing air into the interior of said core through said valve to pressurize the interior of said ball.

6. A method of making an internally pressurized tennis ball comprising the steps of:
(a) providing a one-way air valve in a side wall of at least one of a pair of molded semi-hemispheric elastomeric material core halves with each of said halves having an annular generally flat base surface;
(b) applying a thermosetting adhesive means to said base surfaces of said core halves for thermal bonding of said halves together;
(c) joining said core halves to each other in the presence of atmospheric pressure with said base surfaces in abutting relation;
(d) applying heat and pressure externally to said joined core halves to cure and set said adhesive means with said core halves interior air mass being only that occurring by virtue of the atmospheric pressure as it existed when said halves were joined together;
(e) introducing air into the interior of said core through said valve to pressurize the interior of said ball; and
(f) applying a tennis ball cover about said core.

7. A method of making an internally pressurized tennis ball comprising the steps of making a tennis ball core in accordance with the method of claims 1, 2, 3 or 4 and the additional step of:
(a) applying a tennis ball cover exteriorly of said core to provide a completed tennis ball.

8. A method of making a fabric covered internally pressurized ball comprising the steps of:
(a) providing a pair of molded semi-hemispheric elastomeric material core halves with one of said halves having an internally molded air valve in a side wall thereof and with each of said halves having an annular generally flat base surface;
(b) applying a thermosetting adhesive means to said base surfaces of said core halves for thermal bonding of said halves together;
(c) joining said core halves to each other in the pressure of atmospheric pressure with said base surfaces in abutting relation;
(d) applying heat to said joined core halves to cure and set said adhesive means with said core halves interior air mass being only that occurring by virtue of the atmospheric pressure as it existed when said halves were joined together;
(e) applying a fabric like covering about said core and adhesively securing said covering to said core; and
(f) providing a desired internal air pressure within said core to produce a desired ball bounce characteristic by introducing additional air into said ball via said integral air valve.

9. The method of claim 8 including the additional steps of:
(a) providing a partible mold having a cavity to receive said joined core halves;
(b) trimming any excess material off of the periphery of said core halves where said base surfaces abut by cutting edges on said mold which come together as said mold closes about said joined core halves;
(c) pressurizing said halves against each other by the closing of said mold about said core halves;
(d) heating said core halves by heating said mold with said core halves in contact with said mold.

10. The method of claim 8 including the additional substep of:
localizing the heating of said core halves to the periphery of said core halves where their respective base surfaces abut and marginal areas of said core halves adjacent said periphery.

11. The method of claim 10 including the additional substep of:
reducing the surface to surface contact between said core halves and mold by shaping the interior surfaces of said mold so as to contact only said periphery and marginal areas of core halves to mold engagement with limited top and bottom mold halves to mold engagements to position and pressure said halves together.

12. A method of making an internally pressurized ball, such as a tennis ball, comprising the steps of:
(a) joining two halves of a ball core together through the use of a thermal bonding adhesive with atmospheric pressure only within the core thus formed to provide a pressure less core;
(b) bonding said pressure less core including the substep of heating said adhesive to a temperature of at least 340° F. for a time period of no more than 2 minutes;
(c) removing said pressurize less core from said mold immediately after the completion of said time period; and
(d) subsequently pressurizing the interior of said core to provide a pressurized ball having desirable bounce characteristic due to the internal pressure provided.

13. The method of claim 12 comprising the additional step of:
introducing air into the interior of said core through an air valve provided integrally of one of said core halves.

14. The method of claim 12 comprising the substep of localizing the heating of said core halves during said step of heating said adhesive by reducing surface to surface contact between a heated surrounding mold and said core halves to promote a localized heating of said adhesive and areas of said core halves adjacent the adhesive.

* * * * *